Feb. 23, 1932.  G. A. HUFFAKER  1,846,395
ORCHARD HEATING APPARATUS
Filed May 7, 1929
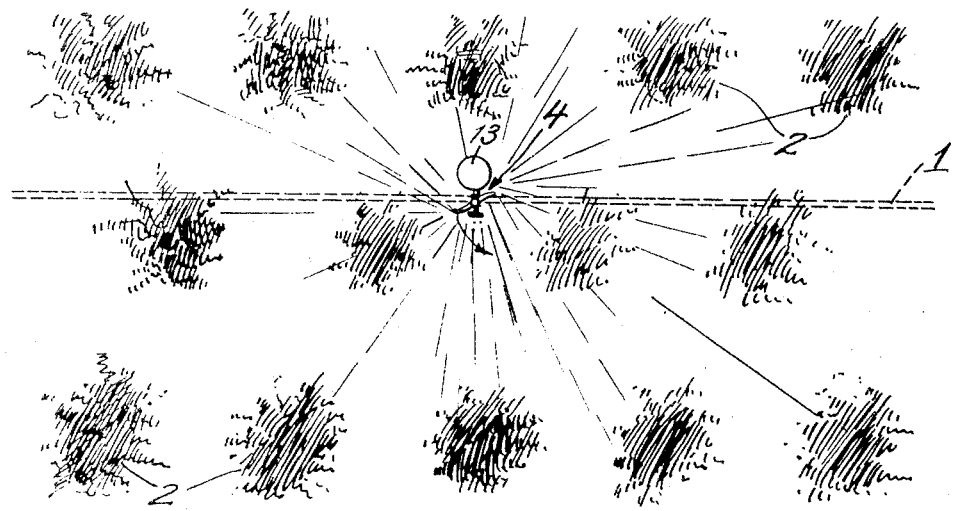
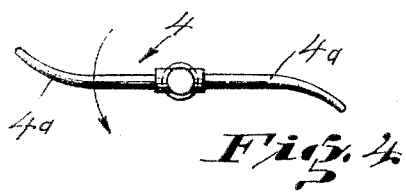
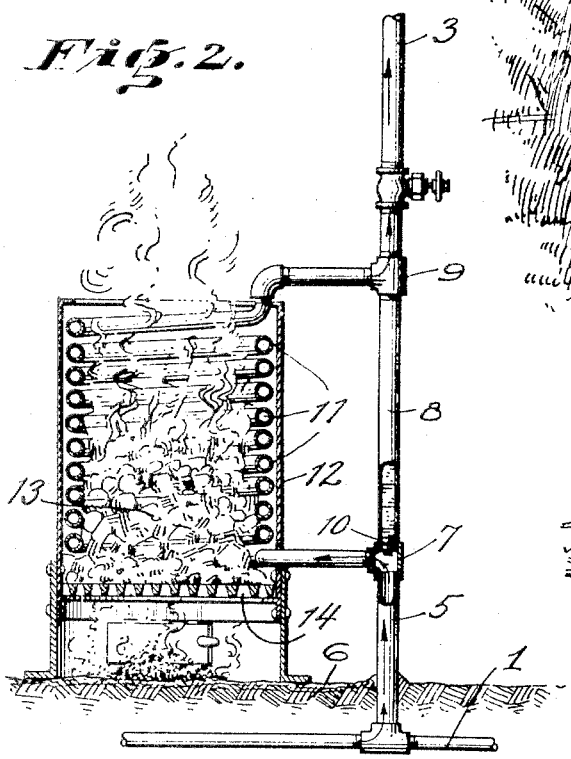
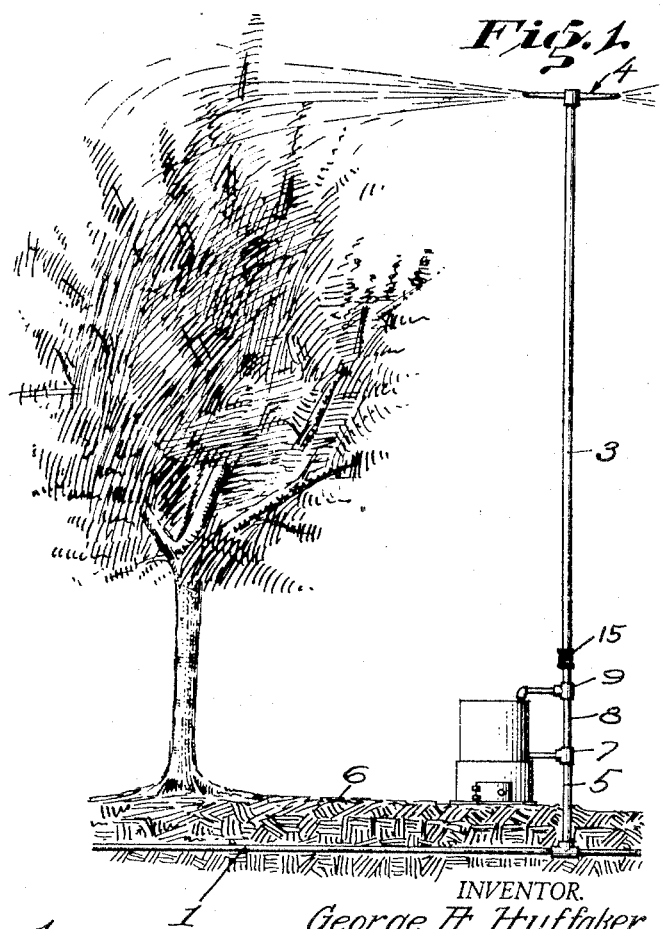
INVENTOR.
George A. Huffaker
BY
Lyon & Lyon
Att'ys Patented Feb. 23, 1932

1,846,395

UNITED STATES PATENT OFFICE

GEORGE A. HUFFAKER, OF VAN NUYS, CALIFORNIA

ORCHARD HEATING APPARATUS

Application filed May 7, 1929. Serial No. 361,122.

This invention relates to orchard heating apparatus. In some parts of the country, especially where citrus fruits are raised, sometimes the temperature falls in winter to a point dangerous to the fruit and the trees. It is customary in some sections of the country to employ smudge pots which burn oil and these smudge pots are scattered a short distance apart throughout the citrus fruit orchard. The "smudging" process is not very satisfactory for several reasons, one of which is that the hot air and gases of combustion rise so rapidly from the level of the trees that the heating effect is almost nullified, especially if there is any wind.

Another objection to smudging is that the process is complained of by persons living in the vicinity of the orchards on account of the soot floating in the air caused by the burning oil.

One of the objects of the present invention is to provide means to retard the escape of the hot air and gases and to provide means for utilizing more effectively the heat units present in the gases of combustion.

A further object is to provide an orchard heating apparatus of simple construction which will provide means for transferring a large part of the heat generated by fuel, to water, and to provide means for utilizing the heat of this water to maintain the temperature existing in the orchard; also to provide means for utilizing the water in such a way that it will tend to spread itself among the trees and at the same time disseminate the gases of combustion and hot air, and in this way hold the generated heat as near to the ground as possible.

Further objects of the invention will appear hereinafter.

The invention consists of novel parts and combination of parts to be described hereinafter, all of which contribute to produce an efficient orchard heating apparatus.

A preferred embodiment of the invention is described in the following specification, while the broad scope of the invention is pointed out in the appended claims.

In the drawings:

Figure 1 is a diagrammatic view illustrating the apparatus and showing its relation to a nearby tree.

Figure 2 is a vertical section of the apparatus near the ground and further illustrating details of the stand pipe which constitutes a feature of the invention.

Figure 3 is a diagrammatic plan illustrating the relation of the heating apparatus to the trees in an orchard.

Figure 4 is a plan of a sprinkler head which I employ as a part of my apparatus.

Referring more particularly to the parts, 1 represents a water pipe or runner which extends through the orchard near the trees 2 (see Figure 3) and at suitable intervals this pipe 1 is provided with a stand pipe 3 that extends upwardly to carry the water up to a sprinkler head 4 of rotary type. The water flowing in the pipes is of sufficient pressure to rotate the sprinker head 4 at the usual high velocity of such heads, thereby throwing drops of water in all directions.

According to my invention, I provide for heating the water which is sprinkled from the sprinkler head 4. In order to do this, the stand pipe 3 is formed with a foot section 5 that extends up a short distance above the ground level 6 where it carries a T-connection 7. Above this T-connection an upper section 8 for the stand pipe is provided connecting with another T-connection 9, and the connection through the pipe 8 is closed by any suitable means, for example, by means of plug 10 (see Figure 2). The apparatus includes a heater coil 11 in the form of a helix on a vertical axis and set in an upright position in a heater and having a casing in the form of a cylindrical shell 12. The periphery of the coil 11 should be substantially against the wall of the heater. The wraps of the coil form a fire pot to receive coke or coal 13 supported on a grate 14. The ends of this coil are connected with the T-connections 7 and 9. By passing the water through the coil a considerable amount of heat within the heater is transferred to the water and is retained in the drops of water sprinkled in the orchard or on the trees. Furthermore, there is of course a large amount of heat units in the gases of combustion and hot air that pass up from the upper end of the heater which is open (see Figure 2). As these hot gases and air ascend, the ascending column is broken up and its ascent retarded by the falling drops of hot water. In this way, the upward flow of the hot air and gases from the heater largely are prevented and the falling drops from the sprinkler tend to carry this air with them down onto the trees. At the same time, the drops of water tend to take up some of the heat from the hot air ascending through the falling drops.

If desired the upper section of the stand pipe may be provided with a valve 15 for controlling the flow of water to the sprinkler.

The sprinkler may be of any desired type, but it is preferably of such a type that the water emitted by it is thrown out in drops, that is to say, it should not be a sprinkler of the type that operates to throw a continuous stream of water. The sprinkler which I prefer to employ is of the common type now on the market and has the general form illustrated in Figure 4, that is to say, it presents two diametrically opposite tubular arms 4a, the ends of which bend toward the rear with respect to the direction of rotation, giving an effect known as a "Barker's mill".

By employing the plugged section of pipe between the T-connections 7 and 9. the stability of the upright pipe is greatly increased and this stability is also augmented by the presence of the horizontal connections from the T's 7 and 9 that connect to the coil. The coil, by its contact with the heater, enables the weight of the heater to assist in giving stability to the upright pipe.

It is understood that the embodiment of the invention described herein is only one of the many embodiments this invention may take, and I do not wish to be limited in the practice of the invention, nor in the claims, to the particular embodiment set forth.

What I claim is:

1. In orchard heating apparatus, the combination of a water pipe extending along through the orchard, a substantially vertical stand pipe extending up from the first named pipe with a rotary sprinkler head at the upper end of the same, a substantially cylindrical upright shell adjacent the stand pipe, a heater coil connected into the stand pipe, and through which the water passes to the sprinkler head, said coil being disposed within the said cylindrical shell with the periphery of the coil located adjacent to the wall of the shell so that the space within the coil forms a fire pot for the fuel, the upper end of said shell being open to permit the escape of the gases of combustion substantially in line with the stand pipe and under the sprinkler head.

2. In orchard heating apparatus, the combination of a water pipe extending along through the orchard, a substantially vertical stand-pipe having a foot-section with a T-connection a short distance above the ground and having an upper section substantially in line with the foot section and including a T-connection above the lower T-connection, means for plugging the pipe between the T-connections, a coil connected with the T-connections, means for heating the coil, and a rotary sprinkler head attached to the upper end of the stand pipe.

3. In orchard heating apparatus, the combination of an open heater operating to permit the gases of combustion and hot air to escape upwardly and a water sprinkler located above, and substantially in line with, the heater, whereby the falling drops of water retard the upward movement of the hot air and gases.

4. In orchard heating apparatus, the combination of a heater with a coil for heating water, a stand pipe extending upwardly from the coil with a sprinkler head at the upper end of the same substantially in line with the heater for developing a descending spray of water, the descending spray operating to retard the upward flow of the hot air and gases passing upwardly from the heater.

Signed at North Hollywood, California, this 30th day of April, 1929.

GEORGE A. HUFFAKER.